United States Patent
Ban et al.

(10) Patent No.: US 8,582,446 B2
(45) Date of Patent: Nov. 12, 2013

(54) RESPONDING TO CHANGE IN A DATA COMMUNICATION NETWORK SYSTEM

(75) Inventors: Oliver Keren Ban, Austin, TX (US); Shu-Chen Lim, Singapore (SG); YongGuo Luo, Shenzhen (CN); Jibao Wang, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 12/195,654

(22) Filed: Aug. 21, 2008

(65) Prior Publication Data

US 2009/0052337 A1 Feb. 26, 2009

(30) Foreign Application Priority Data

Aug. 21, 2007 (CN) .......................... 2007 1 0146565

(51) Int. Cl.
*G01R 31/08* (2006.01)
*H04L 12/28* (2006.01)

(52) U.S. Cl.
USPC ............................. 370/248; 370/250; 370/401

(58) Field of Classification Search
None
See application file for complete search history.

(56) References Cited

U.S. PATENT DOCUMENTS

| | | | |
|---|---|---|---|
| 6,493,320 B1 | 12/2002 | Schober et al. | |
| 6,947,377 B1 * | 9/2005 | Shimano et al. | 370/228 |
| 7,471,636 B2 * | 12/2008 | Vasseur et al. | 370/242 |
| 2002/0050936 A1 * | 5/2002 | Kato et al. | 341/100 |
| 2003/0058871 A1 * | 3/2003 | Sastry et al. | 370/401 |
| 2003/0093559 A1 * | 5/2003 | Ichinohe et al. | 709/239 |
| 2004/0139179 A1 | 7/2004 | Beyda | |
| 2005/0278784 A1 | 12/2005 | Gupta et al. | |
| 2007/0077896 A1 | 4/2007 | Ho et al. | |
| 2009/0257742 A1 * | 10/2009 | Chiu et al. | 398/2 |
| 2010/0022202 A1 * | 1/2010 | Ho et al. | 455/78 |
| 2010/0135370 A1 * | 6/2010 | Best | 375/219 |

FOREIGN PATENT DOCUMENTS

WO   WO0215491   2/2002

* cited by examiner

*Primary Examiner* — Jutai Kao
(74) *Attorney, Agent, or Firm* — Schmeiser, Olson & Watts, LLP; John Pivnichny

(57) ABSTRACT

A method and system for responding to changes in the system. The system includes two or more routers which are electrically connected together in a network tree structure. Each router includes an electronic connection port and a routing table. A direct current balance exists at the electronic connection port of each route. A change in the direct current balance at the electronic connection port of at least one router of the two or more routers is detected. An occurrence of changes in the system that relate to each router of the at least one router is ascertained from the detecting. Responsive to the ascertaining, a new routing table is generated for each router of the at least one router. Each new table includes the changes in the system that relate to each route of the at least one router.

16 Claims, 4 Drawing Sheets

RESPONDING TO CHANGE IN A DATA COMMUNICATION NETWORK SYSTEM

FIELD OF THE INVENTION

The present invention relates to a method and data communication network system for responding to changes in the data communication network system.

BACKGROUND OF THE INVENTION

With the rapid and strong development of large interconnection networks, such as Internet, route technology more and more becomes a key of network technology and routers become one of greatly important network devices. By using the routers, the networks can be interconnected and isolated.

In a data communication network including a plurality of routers, when the router receives data packets and routes them, its operations comprise two actions: finding a pathway (routing selection) and forwarding data packets. Finding the pathway comprises determining an optimal pathway to a destination, which can be implemented with a routing selection algorithm. To find the optimal pathway, it is necessary to establish a routing table including routing information. According to the routing table, the router can know relationships between the destination and a next-hop router and determine the optimal pathway based on measurements. Forwarding data packets comprises transmitting the data packets along the optimal pathway. When receiving the data packets, the router searches the routing table based on the information in the packet head to determine the next-hop router and then transmits the data packets to the next-hop router. Through the above operations, the data packets can be transmitted in the network.

FIG. 1 is a schematic diagram showing the data communication network system including seven routers R1-R7 is changed. As shown in FIG. 1, there are two pathways from a source router R1 to a destination router R7: R1→R2→R3→R7 and R1→R4→R5→R6→R7, wherein the optimal pathway is R1→R2→R3→R7. In this way, when transmitting the data packets, the source router R1 selects the router R2 as the next-hop router and transmits the data packets to the router R2. Then, the router R2 selects the router R3 as the next-hop router and transmits the data packets to the router R3. Finally, the router R3 transmits the received data packets to the destination router R7. However, if the router R2 is removed or down, or the bandwidth of the router R2 becomes small, for example, from 1 Gbps to 1 Mbps, the overall performance of the pathway R1→R2→R3→R7 will be limited by the performance of the segment R2→R3 which will adversely influence the transmission of the data packets or cause the quality of service of the transmission pathway to be decreased.

SUMMARY OF THE INVENTION

The present invention provides a method for responding to changes in a data communication network system comprising a plurality of routers, said routers being electrically connected together in a network tree structure, each router comprising an electronic connection port and a routing table, a direct current balance existing at the electronic connection port of each router, said method comprising:

detecting a change in the direct current balance at the electronic connection port of at least one router of the plurality of routers;

ascertaining from said detecting that changes in the data communication network system that relate to each router of the at least one router have occurred; and responsive to said ascertaining, generating a new routing table for each router of the at least one router, said new routing table for each router of the at least one router comprising the changes in the data communication network system that relate to each router of the at least one router.

The present invention provides a data communication network system comprising a plurality of routers, said routers being electrically connected together in a network tree structure, each router comprising an electronic connection port and a routing table, a direct current balance existing at the electronic connection port of each router, said plurality of routers configured to perform a method for responding to changes in the data communication network system, said method comprising:

detecting a change in the direct current balance at the electronic connection port of at least one router of the plurality of routers;

ascertaining from said detecting that changes in the data communication network system that relate to each router of the at least one router have occurred; and generating a new routing table for each router of the at least one router in response to said ascertaining, said new routing table for each router of the at least one router comprising the changes in the data communication network system that relate to each router of the at least one router.

The present invention provides a data communication network system, comprising:

a plurality of routers, said routers being electrically connected together in a network tree structure, each router comprising an electronic connection port and a routing table, a direct current balance existing at the electronic connection port of each router, said plurality of routers configured to perform a method for responding to changes in the data communication network system;

means for detecting a change in the direct current balance at the electronic connection port of at least one router of the plurality of routers;

means for ascertaining from said detecting that changes in the data communication network system that relate to each router of the at least one router have occurred; and means for generating a new routing table for each router of the at least one router in response to said ascertaining, said new routing table for each router of the at least one router comprising the changes in the data communication network system that relate to each router of the at least one router.

DETAILED DESCRIPTION OF THE INVENTION

It is believed that features and advantages of the present invention will become clearer through the following detailed description of the embodiments of the present invention in conjunction with the drawings.

The present invention provides a method for sensing a network change in a data communication network system including a plurality of routers, a method for configuring a router in the data communication network system, which methods can sense the network change of the data communication network system, and can enable the related routers to obtain information associated with the network change quickly, and can reconfigure the respective routers. In addition, the present invention can provide a router and a data communication network system including the routers.

The present invention provides a method for sensing a network change in a data communication network system including a plurality of routers, which comprises: setting up electronic connections between the plurality of routers; sensing direct current (DC) balance of an electronic connection port of each of the plurality of routers to determine whether there exists a router of which the direct current balance is changed; and if there exists the router of which the direct current balance is changed, indicating the data communication network system having been changed.

The present invention provides a method for configuring a router in a data communication network system including a plurality of routers, which comprises: sensing a network change in the data communication network system by using the above method for sensing a network change in the data communication network system; reconfiguring the routers of which the direct current balances are changed when the network change of the data communication network system is sensed; and regenerating new routing tables for the routers of which the direct current balances are changed to obtain configuration change information.

The present invention provides a router, which comprises: an electronic connection port for connecting electronically with other routers; and a sensor for sensing a direct current balance of the electronic connection port to determine whether the direct current balance of the router is changed. The router is configured to generate and store a routing table.

The present invention provides a data communication network system, which comprises: a plurality of routers, each of which is the above router.

Figure 1:
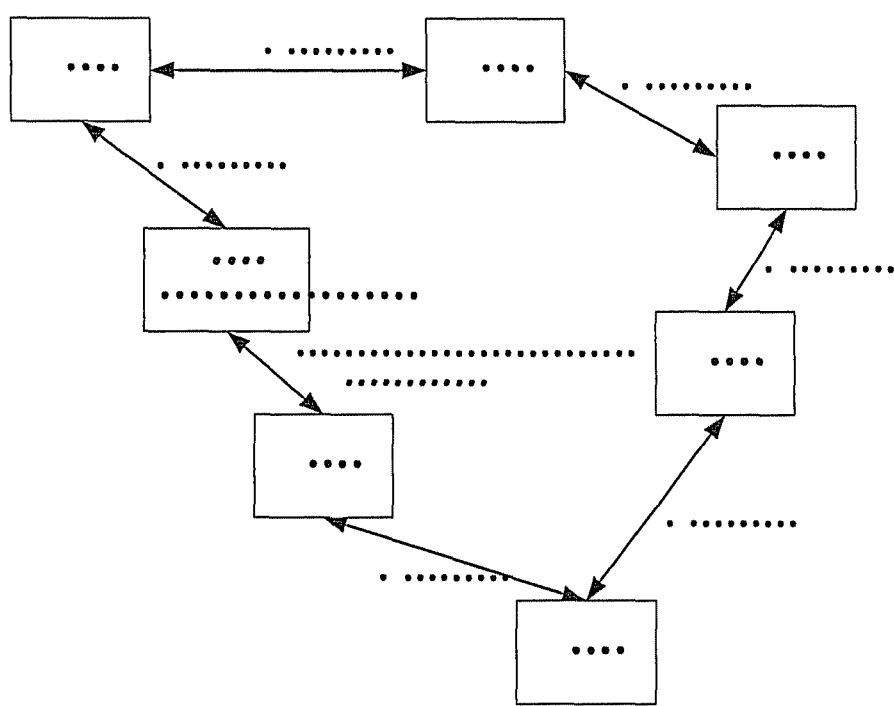
FIG. 1 is a schematic diagram showing the data communication network system including seven routers is changed.
Figure 2:
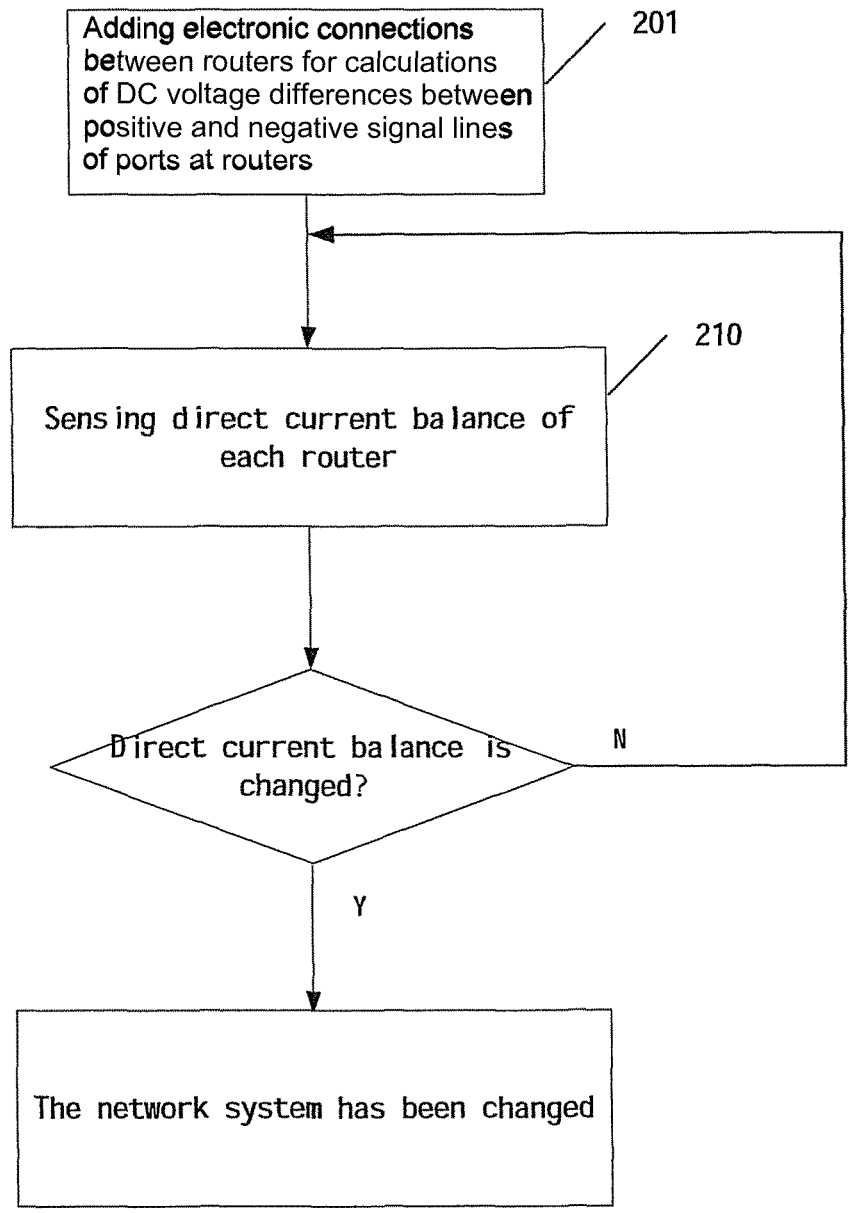
FIG. 2 is a flowchart of a method for sensing a network change in a data communication network system including a plurality of routers according to one embodiment of the present invention.

FIG. 2 is a flowchart of a method for sensing a network change in a data communication network system including a plurality of routers according to one embodiment of the present invention. This embodiment will be described in detail in conjunction with FIG. 2.

As shown in FIG. 2, at step 201, electronic connections are set up between the routers of a plurality of routers in the data communication network system. These electronic connections are newly added connections for transmitting electronic signals, rather than the original connections between the routers. When the routers are electronically connected with each other, the routers are interconnected through the respective electronic connection ports which are placed in the physical layer of the respective routers. Specifically, the routers are connected with each other via the positive and negative signal lines and the ground lines of the electronic connection ports.

In this embodiment, the electronic connections are configured as a daisy-chain structure which uses at least one router in the data communication network system as root node. The daisy-chain structure is known for persons skilled in the art and will be described briefly here. The daisy-chain structure is a network tree structure without a loop. Therefore, the data communication network system including a plurality of routers can form the network tree structure having at least one root node by means of the electronic connections.

Next, it is sensed whether the data communication network system has been changed, which can be achieved by sensing the direct current balances of the routers in the data communication network system. Specifically, at step 210, the direct current balance of the electronic connection port of each router of the plurality of routers is sensed to determine whether there exists a router of which the direct current balance is changed. If there exists at least one router at which the direct current balance is changed, it is determined that the data communication network system has been changed. The at least one router at which the direct current balance is changed consists of one router or at least two routers. If there exists no router of which the direct current balance is changed, it is determined that the data communication network system has no network change, and the method returns to step 210 to continue the sensing process, or the method ends.

In this embodiment, when the direct current balance of the electronic connection port of the router is sensed, a direct current voltage difference between the positive and negative signal lines of the electronic connection port is calculated. Then the direct current voltage difference is compared with a predetermined parameter range that has been specified. If the direct current voltage difference is within the predetermined parameter range, it is indicated that the direct current balance of the electronic connection port of the router is unchanged. In contrast, if the direct current voltage difference is out of the predetermined parameter range, it is indicated that the direct current balance of the electronic connection port of the router has been changed, and thus the data communication network system has been changed.

It can be seen from above description that the method for sensing a network change in a data communication network system including a plurality of routers can sense the network change of the data communication network system by sensing whether the direct current balances of the electronic connection ports of the routers have been changed (i.e., performing the direct current sensing), and can enable the routers affected by the change of the data communication network system to become aware such changes.

Figure 3:
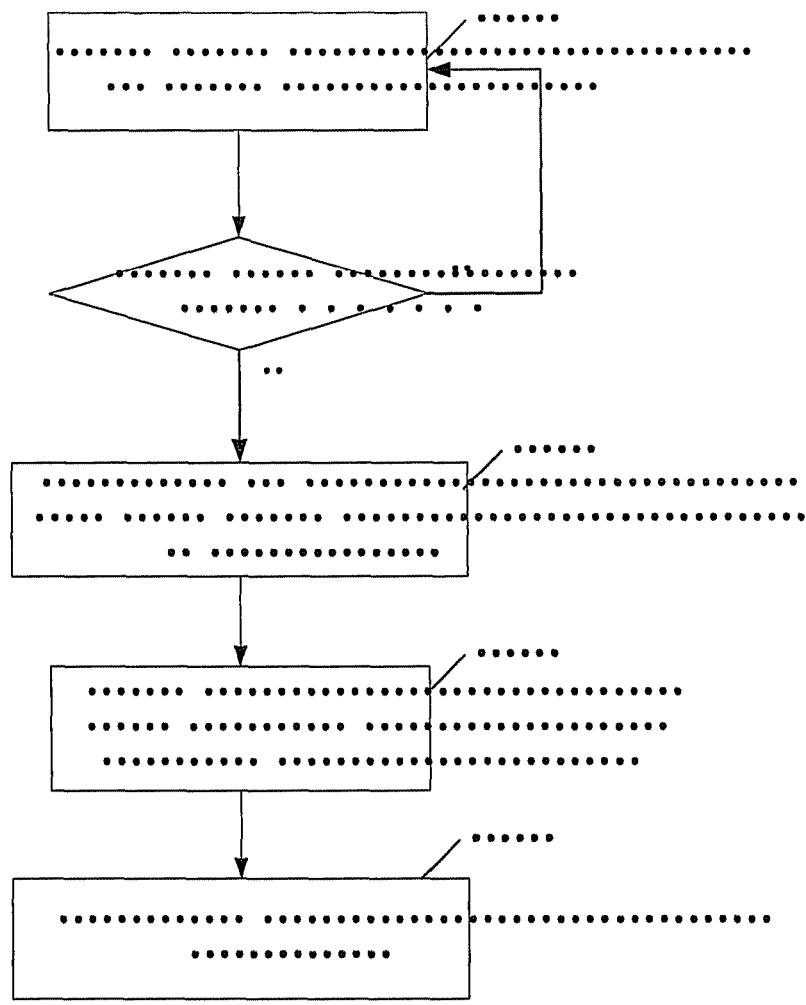
FIG. 3 is a flowchart of a method for configuring a router in a data communication network system including a plurality of routers according to one embodiment of the present invention.

Under the same inventive concept, FIG. 3 is a flowchart of a method for configuring a router in a data communication network system including a plurality of routers according to one embodiment of the present invention. The descriptions of the portions which are same as those of the previous embodiment are omitted properly. This embodiment will be described in detail as follows in conjunction with FIG. 3.

As shown in FIG. 3, at step 301, it is sensed whether the data communication network system has been changed. This step can be performed by using the method for sensing a network change in a data communication network system including a plurality of routers as shown in FIG. 2; i.e. it is determined whether the data communication network system has been changed by sensing the direct current balance of the electronic connection port of each of the plurality of routers.

Then, if it is sensed that the data communication network system has been changed, at step 310 each router of which the direct current balance is changed is reconfigured; i.e. each router which makes the data communication network system change is reconfigured. Specifically, each router to be reconfigured is enabled to enter "Reset" mode to regenerate a new routing table to store configuration change information comprising changes in the data communication network system that relate to each router at which the direct current balance is changed. In this embodiment, the configuration change information for a router at which the direct current balance is changed includes at least one of: routing change information (i.e., change in the pathways in the data communication network system between a next-hop router and a destination for data packets received by the router), bandwidth allocation information (i.e., change in the bandwidth that the router can accommodate), and priority information (i.e., change in the relative priority of the pathways in the data communication network system between the next-hop router and the destination for the data packets received by the router). If it is sensed that the data communication network system has no network change, then step 301 is repeated to continue the sensing process.

Next, at step 320, those reconfigured routers send their configuration change information to the surrounding routers (i.e., the neighboring routers in the daisy chain structure), and then at step 330, the surrounding routers generate the new routing tables according to the received configuration change information. In the case that the routers in the data communication network system form the daisy-chain structure through the electronic connections, the reconfigured routers can send their configuration change information to their subnodes (i.e., neighbor nodes) according to the daisy-chain structure.

It can be seen from above description that by using the method for configuring a router in a data communication network system of this embodiment, the related routers in the data communication network system can be further reconfigured based on the sensing of the network change of the data communication network system, and the related change information can be communicated to other routers.

Figure 4:
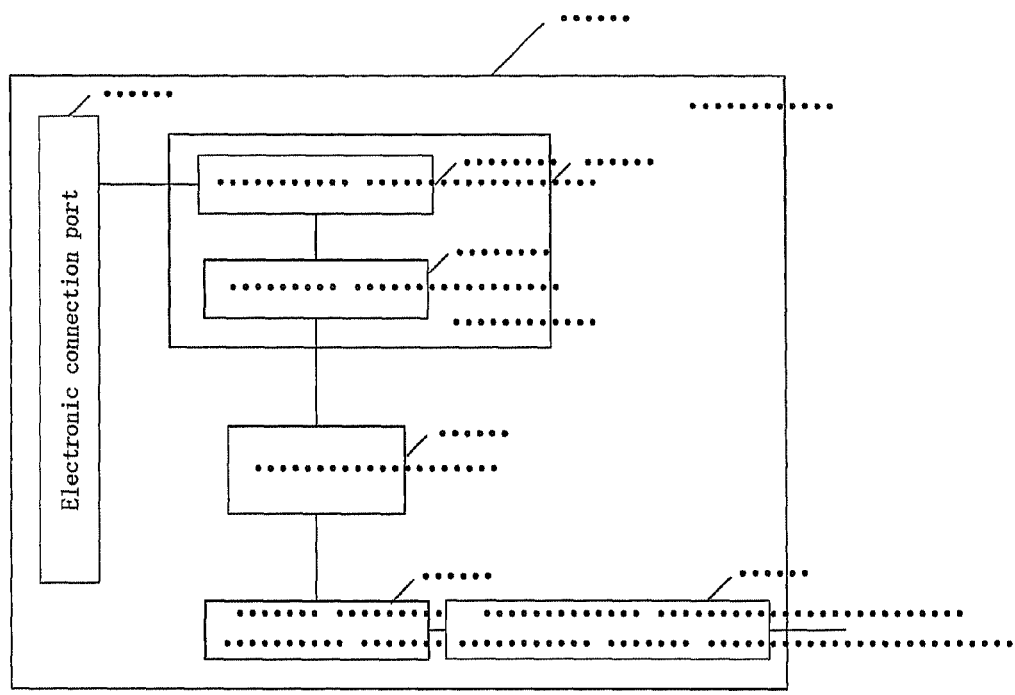
FIG. 4 is a structural block diagram of a router according to one embodiment of the present invention.

Under the same inventive concept, FIG. 4 is a structural block diagram of a router according to one embodiment of the present invention. This embodiment will be described in detail in conjunction with FIG. 4.

As shown in FIG. 4, the router 400 of this embodiment comprises an electronic connection port 401 with which the router 400 can be electronically connected with other routers; and a sensor 402 for sensing a direct current balance of the electronic connection port 401 to determine whether the direct current balance of the router 400 is changed.

Using the electronic connection port 401, the electronic connections between the router 400 and other routers can form a daisy-chain structure which uses the router 400 and/or any other one or more routers as root nodes of the daisy-chain structure. As described previously, the daisy-chain structure is the network tree structure without a loop. Specifically, at the electronic connection port 401, the router 400 and other routers are connected with each another by means of the positive and negative lines and the ground line.

After the electronic connections between the router 400 and other routers are set up through the electronic connection port 401, the sensor 402 senses the direct current balance of the electronic connection port 401 to determine whether the direct current balance of the router 400 is changed.

Specifically, in the sensor 402, at first, a calculating unit 4021 calculates a direct current voltage difference between the positive and negative signal lines of the electronic connection port 401, and then a comparing unit 4022 compares the direct current voltage difference with a predetermined parameter range. If the comparison result from use of the comparing unit 4022 is that the direct current voltage difference is within the predetermined parameter range, it is indicated that the direct current balance of the electronic connection port 401 is unchanged. If the comparison result of the comparing unit 4202 is that the direct current voltage difference is out of the predetermined parameter range, it is indicated that the direct current balance of the electronic connection port 401 has been changed, and thus the sensing result of the sensor 402 is that the direct current balance of the router 400 is changed.

It can be seen from above description that the router of this embodiment can sense the network change of the direct current balance by performing direct current sensing on the electronic connection port, thereby determining the network change of the data communication network system.

Further, the router 400 of this embodiment can comprise a reset unit 403 for resetting the router 400 in the case that the sensing result of the sensor 402 is that the direct current balance of the router 400 is changed; and a routing table generating unit 404 for generating a routing table to obtain configuration change information when the router 400 is reset.

As described in the above, the configuration change information includes at least one of the routing change information, the bandwidth allocation information, and the priority information.

When the sensing result of the sensor 402 is that the direct current balance of the router 400 is changed, the reset unit 403 enables the router 400 to enter "Reset" mode to perform reconfiguration. Then, the routing table generating unit 404 generates the new routing table to obtain the configuration change information.

In addition, the router 400 of this embodiment can comprise a configuration change information sending unit 405 which sends the configuration change information obtained from the routing table generating unit 404 to the surrounding routers.

It can be seen from above description that the router 400 of this embodiment can be reconfigured in the case that the direct current balance of the router has been changed and can send the configuration change information to other routers, so that the related routers can be reconfigured according to the configuration change information.

The router 400 of this embodiment and its components can be implemented by a hardware circuit such as Very Large Scale Integrated Circuit or gate array, semiconductor such as logic chips and transistors, or by a programmable hardware device such as field programmable gate array, programmable logic device, and by software executing on various types of processors, and by the combination of above hardware circuit and software. Moreover, the router 400 of this embodiment can operationally perform the method for sensing a network change in a data communication network system including a plurality of routers and the method for configuring a router in the data communication network system as shown in FIGS. 2 and 3.

In addition, under the same inventive concept, it is also provided with a data communication network system which comprises a plurality of routers as shown in FIG. 4.

Although the method for sensing a network change in a data communication network system including a plurality of routers, the method for configuring a router in the data communication network system including a plurality of routers, and the router and the data communication network system including the routers are described in detail in conjunction with embodiments of the present invention, the present invention is not limited as above. It should be understood for persons skilled in the art that the above embodiments may be varied, replaced or modified without departing from the spirit and the scope of the present invention.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for responding to changes in a data communication network system comprising a plurality of routers, said routers of the plurality of routers being electrically connected together in a network tree structure, each router of the plurality of routers comprising an electronic connection port and a routing table, a direct current balance existing at the electronic connection port of each router of the plurality of routers, said method comprising:

electrically connecting together the routers of the plurality of routers in the network tree structure via original electrical connections among the routers;

each router of the plurality of routers generating and storing the routing table respectively in each router;

after said electrically connecting together the routers in the network tree structure via original electrical connections among the routers, adding new electrical connections among the routers of the plurality of routers via positive and negative signal lines and ground lines at the respective electronic connection port of each router of the plurality of routers for subsequent use of said positive and negative signal lines to calculate a direct current (DC) voltage difference between the positive and negative signal lines of the electronic connection port of each router of the plurality of routers, said new electrical connections among the routers configured to transmit electrical signals among the routers of the plurality of routers;

after said adding said new electrical connections, calculating the DC voltage difference between the positive and negative signal lines of the electronic connection port of each router of the plurality of routers;

after said calculating the DC voltage difference, determining that the calculated DC voltage difference is outside of a predetermined parameter range of distinct voltages;

determining, from said determining that the calculated DC voltage difference is outside of said predetermined parameter range of distinct voltages, that a change has been detected in the direct current balance at the electronic connection port of at least one router of the plurality of routers;

ascertaining, from said determining that said change has been detected in the direct current balance at the electronic connection port of at least one router of the plurality of routers, that changes in the data communication network system that relate to each router of the at least one router have occurred; and responsive to said ascertaining, each router of the at least one router regenerating a new routing table respectively for each router of the at least one router, said new routing table for each router of the at least one router comprising the changes in the data communication network system that relate to each router of the at least one router.

2. The method of claim 1, wherein said regenerating comprises resetting each router of the at least one router to a reset mode that causes said regenerating to be performed, and wherein the method further comprises:

the routers of the at least one router sending the changes in the data communication network system that relate to each router of the at least one router to respective neighboring routers of the plurality of routers surrounding each router of the at least one router;

said respective neighboring routers receiving the changes in the data communication network system sent by the routers of the at least one router; and each respective neighboring router regenerating a new route table for each respective neighboring router according to the changes in the data communication network system received by each respective neighboring router.

3. The method of claim 2, wherein each router of the at least one router comprises:

a calculating unit that performs said calculating;

a comparing unit that performs said determining that the calculated direct current voltage difference is outside of the predetermined parameter range by comparing the calculated direct current voltage difference with the predetermined parameter range;

a reset unit that performs said resetting;

a routing table generating unit that performs said generating and said regenerating; and a configuration change sending unit that performs said sending.

4. The method of claim 1, wherein the changes in the data communication network system that relate to each router of the at least one router comprise a change in pathways in the data communication network system between a next-hop router and a destination for data packets received by each router of the at least one router.

5. The method of claim 1, wherein the changes in the data communication network system that relate to each router of the at least one router comprise a change in a bandwidth that each router of the at least one router can accommodate.

6. The method of claim 1, wherein the changes in the data communication network system that relate to each router of the at least one router comprise a change in a relative priority of the pathways in the data communication network system between a next-hop router and a destination for data packets received by each router of the at least one router.

7. The method of claim 1, wherein the at least one router consists of a single router.

8. The method of claim 1, wherein the changes in the data communication network system that relate to each router of the at least one router comprise:

a change in pathways in the data communication network system between a next-hop router and a destination for data packets received by each router of the at least one router;

a change in a bandwidth that each router of the at least one router can accommodate; and a change in a relative priority of the pathways in the data communication network system between a next-hop router and a destination for data packets received by each router of the at least one router.

9. A data communication network system comprising a plurality of routers, said routers of the plurality of routers being electrically connected together in a network tree structure, each router of the plurality of routers comprising an electronic connection port and a routing table, a direct current balance existing at the electronic connection port of each router of the plurality of routers, said plurality of routers configured to perform a method for responding to changes in the data communication network system, said method comprising:

electrically connecting together the routers of the plurality of routers in the network tree structure via original electrical connections among the routers;

each router of the plurality of routers generating and storing the routing table respectively in each router;

after said electrically connecting together the routers in the network tree structure via original electrical connections among the routers, adding new electrical connections among the routers of the plurality of routers via positive and negative signal lines and ground lines at the respective electronic connection port of each router of the plurality of routers for subsequent use of said positive and negative signal lines to calculate a direct current (DC) voltage difference between the positive and negative signal lines of the electronic connection port of each router of the plurality of routers, said new electrical connections among the routers configured to transmit electrical signals among the routers of the plurality of routers;

after said adding said new electrical connections, calculating the DC voltage difference between the positive and negative signal lines of the electronic connection port of each router of the plurality of routers;

after said calculating the DC voltage difference, determining that the calculated DC voltage difference is outside of a predetermined parameter range of distinct voltages;

determining, from said determining that the calculated DC voltage difference is outside of said predetermined parameter range of distinct voltages, that a change has been detected in the direct current balance at the electronic connection port of at least one router of the plurality of routers;

ascertaining, from said determining that said change has been detected in the direct current balance at the electronic connection port of at least one router of the plurality of routers, that changes in the data communication network system that relate to each router of the at least one router have occurred; and responsive to said ascertaining, each router of the at least one router regenerating a new routing table respectively for each router of the at least one router, said new routing table for each router of the at least one router comprising the changes in the data communication network system that relate to each router of the at least one router.

10. The system of claim 9, wherein said regenerating comprises resetting each router of the at least one router to a reset mode that causes said regenerating to be performed, and wherein the method further comprises:

the routers of the at least one router sending the changes in the data communication network system that relate to each router of the at least one router to respective neighboring routers of the plurality of routers surrounding each router of the at least one router;

said respective neighboring routers receiving the changes in the data communication network system sent by the routers of the at least one router; and each respective neighboring router regenerating a new route table for each respective neighboring router according to the changes in the data communication network system received by each respective neighboring router.

11. The system of claim 10, wherein each router of the at least one router comprises:

a calculating unit that performs said calculating;

a comparing unit that performs said determining that the calculated direct current voltage difference is outside of the predetermined parameter range by comparing the calculated direct current voltage difference with the predetermined parameter range;

a reset unit that performs said resetting;

a routing table generating unit that performs said generating and said regenerating; and a configuration change sending unit that performs said sending.

12. The system of claim 9, wherein the changes in the data communication network system that relate to each router of the at least one router comprise:

a change in pathways in the data communication network system between a next-hop router and a destination for data packets received by each router of the at least one router;

a change in a bandwidth that each router of the at least one router can accommodate; and a change in a relative priority of the pathways in the data communication network system between a next-hop router and a destination for data packets received by each router of the at least one router.

13. The system of claim 9, wherein the changes in the data communication network system that relate to each router of the at least one router comprise a change in pathways in the data communication network system between a next-hop router and a destination for data packets received by each router of the at least one router.

14. The system of claim 9, wherein the changes in the data communication network system that relate to each router of the at least one router comprise a change in a bandwidth that each router of the at least one router can accommodate.

15. The system of claim 9, wherein the changes in the data communication network system that relate to each router of the at least one router comprise a change in a relative priority of the pathways in the data communication network system between a next-hop router and a destination for data packets received by each router of the at least one router.

16. The system of claim 9, wherein the at least one router consists of a single router.

* * * * *